Aug. 6, 1929.                 H. HOLDEN                1,723,782
                        VENTILATOR FOR AUTOMOBILES
                          Filed Dec. 19, 1928
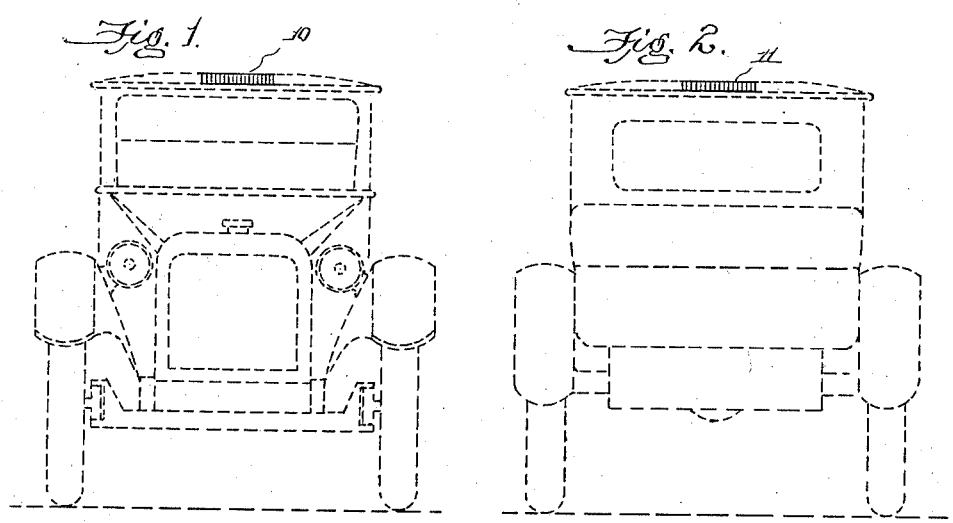
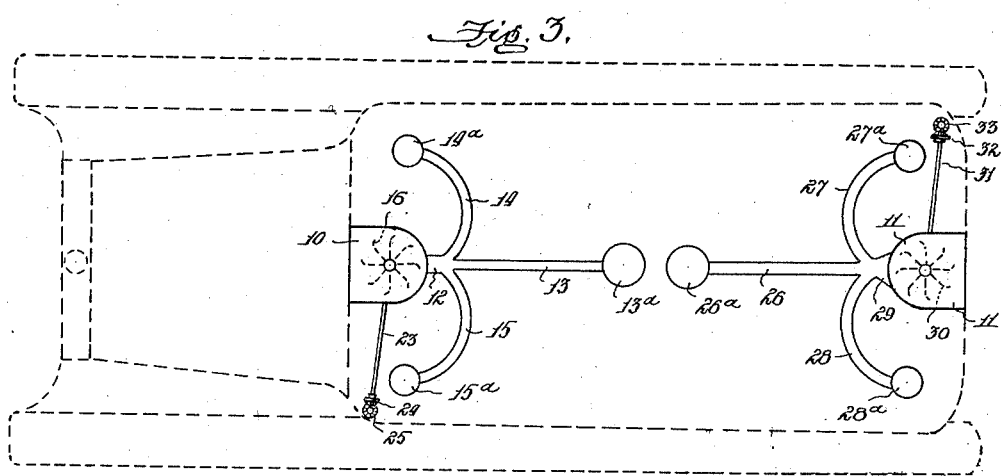
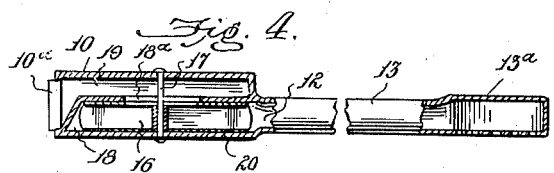
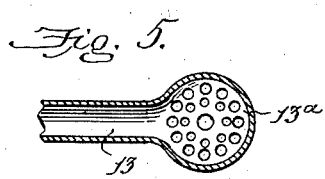
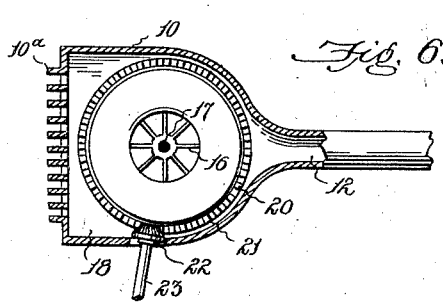
Inventor:
Herbert Holden.

Patented Aug. 6, 1929.

1,723,782

UNITED STATES PATENT OFFICE

HERBERT HOLDEN, OF NEW YORK, N. Y.

VENTILATOR FOR AUTOMOBILES.

Application filed December 19, 1928. Serial No. 327,011.

My invention is an improvement in automobiles of that particular type commonly known as closed cars, including sedans, coupes, etc., and relates more especially to the provision of means for ventilating the car when it is operated in cold weather with the windows closed.

It is well known that when an automobile is in operation and it is attempted to ventilate the closed car by opening the windows to a more or less extent, a draft is created that is too severe for some of the occupants particularly when the automobile is driven at the usual rate of speed, and consequently in this instance it is somewhat difficult to obtain a mild circulation sufficient to purify the air for the comfort of the occupants.

The primary object of my invention therefore is to provide a ventilating system for an automobile that will not only provide for taking in a supply of fresh air and properly distributing it but will also exhaust the impure air, in the present instance the operating parts of the apparatus for the purpose being located in the top of the car so as to not impair the interior appearance thereof, with the intake and outlet openings of the ventilating system located at the front and rear of said top respectively.

A further object of my invention is to provide a ventilating system or apparatus of this particular character in which the pure air is forced into the car and the impure air drawn out by the employment of fans driven from a rotatable part of the automobile.

With these principal objects in view my invention consists in the particular construction and arrangement of parts hereinafter described and specifically set forth in the appended claims.

In the drawings illustrating the preferred embodiment of my invention,

Figure 1 is a front elevation of an automobile in dotted lines showing the location of the air inlet opening.

Fig. 2 is a similar view of the rear end of an automobile showing the location of the air outlet opening.

Fig. 3 is a plan view of the apparatus with the automobile indicated in dotted lines.

Fig. 4 is a detail sectional view of that part of the apparatus employed for supplying air to the automobile.

Fig. 5 is a detail view of one of the ventilators, and

Fig. 6 is a horizontal sectional view of the form of fan casing employed.

In carrying out my invention the ventilating apparatus is located in the top of the automobile between the cover and lining to provide for the intake and outlet of air with ventilators at different locations with respect to the interior of the car. For this purpose I provide box-like casings 10 and 11 at the front and rear ends of the top respectively, the air from the atmosphere being taken in through the casing 10, while the impure air from the car is discharged through the casing 11, and in each instance the open end of the casing is provided with the usual slats 10ª. Each casing is comparatively flat so as to fit between the cover and lining of the top, the size or capacity of the casings depending upon the size of the automobile or amount of air to be drawn into the car as well as impure air to be discharged therefrom.

Opposite the open end of the casing 10 there is connected a pipe 12 communicating with smaller branch pipes 13, 14, and 15 extending to different parts of the car and terminating in ventilating caps 13ª, 14ª, and 15ª, the pipe 13 preferably extending longitudinally to locate the ventilator 13ª at approximately the center of the top while the branch pipes 14 and 15 diverge to locate the ventilators 14ª and 15ª at the sides of the top, although it will be understood that longer branch pipes may be provided for locating the ventilators at the sides of the car. This is the air intake end of the ventilating apparatus and of course in some instances sufficient air may be forced into the casing 10 by the forward motion of the car, but as the said casing is rather long and narrow transversely to fit within the space between the cover and lining of the top it is preferable to draw air from the atmosphere into the car by means of a suction fan 16, as illustrated in the drawings. Any ordinary form of fan may be employed but the construction of fan and casing shown in the drawings is desirable inasmuch as it is particularly adapted to the present situation. The present arrangement consists of a horizontal fan rotatably mounted on a shaft 17 to operate in a compartment 18 of the casing communicating with the pipe 12 and receiving air through the openings 18ª at the center of said casing by way of the compartment 19 which communicates with the inlet opening at the forward end of the casing. For operating the fan it is provided with a bottom plate 20 having peripheral teeth 21 with which meshes a pinion 22 at one end of a shaft 23 suitably supported in the top of the automobile and provided at its other end with a beveled pinion 24 in mesh with a bevel gear-wheel 25 at the upper end of a shaft driven from a rotatable part of the automobile. It will be understood that the fan operates to draw air into the casing and discharge it into the car by means of the pipes having the ventilators located at different parts of the car for effective distribution.

The casing 11 at the rear end of the top for discharging impure air from the car is likewise provided with pipes extending therefrom, the pipe 26 having the ventilator 26ª also extending longitudinally to locate said ventilator near the center of the top, and the branch pipes 27 and 28 diverging from pipe 29 connected to the inner end of said casing. In this instance also the movement of the car may be sufficient to create sufficient suction to withdraw the impure air through the pipes and casing, but the ventilating system will be found more efficient by employing a fan 30 similar to that described with reference to the fan and casing at the forward end of the top, the only difference being that in this instance the curve of the blades with respect to the direction of rotation of the fan is such as to force air out of the casing instead of drawing it in. The fan 30 is driven by shaft 31 extending to a corner of the car and geared by pinion 32 to a gear wheel 33 at the upper end of a suitably driven shaft.

From the foregoing description in connection with the accompanying drawings the construction and operation of the apparatus carrying out my improved ventilating system for closed automobiles will be readily understood, for the air drawn into the front casing 10 by the fan and distributed through the discharge pipes and ventilators will supply fresh air to different parts of the car according to the location of the ventilators, as for instance in the front part of the car, while the impure air will be drawn out of the car through the outlet pipes connected to casing 11 in which the fan operates for creating a suction through said pipes, and of course in this instance also the ventilators may be suitably located so as to cooperate with the air distributing pipes in providing a circulation. As heretofore explained the pipes for discharging pure air into the car may be extended so as to discharge at the sides of the car, and of course other modifications may be resorted to within the spirit and scope of my claims.

It will be obvious that by ventilating a car in the manner hereinbefore described a circulation of air is kept up without inconvenience of drafts, in other words the car may be kept warm and at the same time it will be supplied with fresh air and the impure air collecting in the top of the car will be exhausted at the rear end of the top.

I claim:

1. Means for ventilating an automobile comprising a casing having a partition dividing the casing into upper and lower compartments with a central opening through said partition, a revolving fan in one of the compartments, and ventilating pipes connected to the rear end of said compartment, the other compartment opening out at the opposite end of the casing.

2. Means for ventilating an automobile comprising a narrow casing adapted to fit between the cover and lining of the top of an automobile at the forward end thereof, said casing having a horizontal partition with an opening at the center thereof, a horizontal fan rotatably mounted in the lower compartment formed by the partition, a plate at the lower end of said fan having peripheral teeth, a beveled pinion in mesh with said teeth, a shaft carrying said pinion extending through the top of the car to one corner thereof, and a driven shaft geared to the aforesaid shaft.

HERBERT HOLDEN.